(12) United States Patent
O'Connell et al.

(10) Patent No.: US 7,388,868 B2
(45) Date of Patent: Jun. 17, 2008

(54) CALL-ROUTING APPARATUS, AND ASSOCIATED METHOD, FOR PROVIDING LOCAL CALL HANDLING FUNCTIONS IN A COMMUNICATION NETWORK

(75) Inventors: Peter O'Connell, Heath, TX (US); John Abraira, Frisco, TX (US); Gary Hanson, Plano, TX (US); Xing Chen, Plano, TX (US); Babu Mani, Plano, TX (US)

(73) Assignee: Alcatel Lucent, Paris (FR)

( * ) Notice: Subject to any disclaimer, the term of this patent is extended or adjusted under 35 U.S.C. 154(b) by 792 days.

(21) Appl. No.: 10/321,230

(22) Filed: Dec. 17, 2002
(Under 37 CFR 1.47)

(65) Prior Publication Data

US 2004/0114611 A1   Jun. 17, 2004

(51) Int. Cl.
*H04L 12/28* (2006.01)
*H04L 12/56* (2006.01)

(52) U.S. Cl. .................................... 370/401
(58) Field of Classification Search .............. 370/401, 370/237, 356, 389, 395, 352; 379/37, 49, 379/46, 45, 201, 265, 220, 266, 93.29; 709/229, 709/245, 230, 238, 203; 455/404, 445, 456, 455/521
See application file for complete search history.

(56) References Cited

U.S. PATENT DOCUMENTS 5,253,288 A    10/1993  Rosenbluth et al.
5,418,776 A    5/1995   Purkey et al.
5,661,779 A    8/1997   Lee
6,058,178 A *  5/2000   McKendry et al. ..... 379/212.01
6,130,892 A * 10/2000   Short et al. .................. 370/401
2001/0012343 A1*  8/2001  Dal Molin ............. 379/100.12
2003/0142682 A1*  7/2003  Bressoud et al. ........... 370/401
2003/0152210 A1*  8/2003  Delaney et al. ........ 379/220.01

FOREIGN PATENT DOCUMENTS

WO    WO 96/21989 A    7/1996
WO    WO 00/31933 A    6/2000

* cited by examiner

*Primary Examiner*—Wing Chan
*Assistant Examiner*—Prenell Jones

(57) ABSTRACT

Emergency call-routing apparatus, and an associated method, for use in a packet-based, telephonic network. An emergency call router is positioned selectably to provide local call handling functionality to a local network that is normally connected by way of an access gateway to the telephonic network whose operation is normally controlled by a softswitch. The apparatus is used when, e.g., a total communication link failure condition occurs between the access gateway and the softswitch. The emergency call router selectably routes calls within the local network to permit continued, local calling functionality in spite of the failure of the communication link. High-priority calls, such as calls placed to an emergency dispatch center, are routed within the local network to a designated, local-network station. And local calls are also selectably routed by the emergency call router. A call priority scheme is also used in the event that call capacity is exceeded. Calls of higher priority are permitted while calls of lower priority are blocked.

18 Claims, 3 Drawing Sheets

CALL-ROUTING APPARATUS, AND ASSOCIATED METHOD, FOR PROVIDING LOCAL CALL HANDLING FUNCTIONS IN A COMMUNICATION NETWORK

The present invention relates generally to a manner by which to route a call in a packet-based, or other, communication system. More particularly, the present invention relates to apparatus, and an associated method, by which to provide at least selected rudimentary local call handling functions. The call handling is provided at a local network associated with an access gateway upon total failure of a communication link between the access gateway and a softswitch which controls operations of the system. An emergency call router is provided that is operable upon detection of occurrence of the failure of the communication link. The call router provides at least selected, rudimentary local handling functions that otherwise would not be permitted due to the failure of the communication link. Routing of a priority call, such as a call to an emergency service position located beyond the local network, that would not be completed due to the failure of the communication link, can be routed, instead, by the call router to a substitute service position. And, call handling of selected lower-priority calls is also provided by the emergency call router.

BACKGROUND OF THE INVENTION

The use of communication systems through which to communicate data is an endemic part of modem society. Telephonic communication systems are, perhaps, best exemplary of communication systems that have been widely employed and are regularly utilized by large numbers of users.

In a telephonic communication system, telephonic communication of voice, as well as non-voice, data is generally provided. Telephonic communication networks have been installed throughout significant portions of the world, and users communicate telephonically therethrough by way of telephonic, or other communication, stations connected to the telephonic networks.

Conventionally, telephonic networks provide for circuit-switched communications between telephonic stations that are to be connected to effectuate a communication session therebetween. When a circuit-switched connection is formed, a dedicated channel is provided to permit the telephonic communications between the telephonic stations, a calling party and at least one called party, is provided. For so long as the connection is maintained, telephonic communications between the telephonic stations is permitted. As data forming the telephonic communication might only be intermittently communicated between the telephonic stations during the communication session effectuated by way of the circuit-switched connection, the communication capacity of communication channels defined upon the circuit-switched connection might well not be fully utilized. Use of circuit-switched connections, formed in a telephonic network, as a result, inefficiently utilizes the communication capacity of a telephonic network.

Communication schemes which provide for shared-channel communications, in contrast, more efficiently utilize the communication capacity of a communication system, such as a telephonic communication system. Packet-based communication systems, for instance, utilize shared channels upon which to communicate packet-formatted data. When a shared channel is utilized, more than one communication session is effectuable upon a single shared channel. Because packet-formatted data can be communicated during discrete intervals, the same channel can be utilized to communicate packet-formatted data, during separate time periods to effectuate communication services pursuant to separate communication sessions. More efficient utilization of the communication capacity of a communication system is thereby possible, in contrast, to conventional circuit-switched communication schemes.

Various packet formatting protocols are used when forming, and sending, data packets formed of digital data bits. One protocol scheme, the Internet protocol (IP), or IP protocol, is regularly utilized in many different communication systems and communication applications. Communication devices and apparatus constructed to send, receive, transport, and operate upon IP-formatted data can be configured together in a communication system to provide for the communication of IP-formatted data.

Next-generation telephonic communication systems now being developed include telephonic networks that are predicated upon packet-based communications. In such next-generation systems, voice, non-voice, and multimedia communication services shall be effectuable through the use of packet-based communications, using IP-formatted data.

Such a new-generation telephonic network generally includes a packet data network, or fabric, through which packet-switched channels are formed. Devices referred to as gateways are coupled to the packet data network. Devices referred to as gateways form gateways to the packet data network. Gateways are operable, amongst other things, to form gateways to the packet data network from local networks. When communications in a local network are effectuated using a different type of communication protocol than the protocol used in the packet data network, the gateway connecting the local network to the packet data network performs protocol translation, as well as, perhaps, also voice encoding operations.

For instance, a local network might form a legacy, TDM (time division multiplexed) network. The call handling procedures of the local network would therefore be different than that of a packet-based network.

Operational control of the telephonic communication system is effectuated by a softswitch that functionally forms a part of, or is connected to, the packet data network. The softswitch operates to control connection services of the gateways, operates to control call routing based upon signaling information and database information related to the calling party and called party.

Public safety answering points are amongst the communication devices that can be connected to a packet data network by way of a gateway. An emergency dispatch center is, for instance, the location to which an emergency call, such as a "911 call" in the United States is routed. Such a call is originated at a calling station located at a local network, through a gateway connecting the local network to the packet data network, through the packet data network, to the gateway to which the public service access point is located.

While the new-generation, telephonic networks include various redundancies, such as redundant softswitches, in the event of total failure of a communication link between the gateway to which the local network is coupled and a softswitch associated with the packet data network, the call originated at the telephonic station of the local network cannot be routed to the public safety answering point. Other calls analogously originated at the telephonic station of the local network also cannot be completed. Included amongst the additional calls that cannot be completed are calls to a called party, i.e., the terminating station, at the local network. That is to say, even if a local call is to be originated and terminated entirely within a local network, the new-generation telephonic communication system would not be able to complete such a call.

Calls within the local network could still be completed in spite of the total failure of the communication link, but for the external control provided only by the softswitch in the next-generation system. That is to say, the call handling functionality provided by the softswitch, but unavailable due to the failure of the communication link, prevents continued operation of calls within the local network.

If a manner could be provided by which to provide local call control in the event of failure of a communication link, at least limited communications within the local network could still be effectuable. And, if the local calls could still be effectuable, a call originated at the local network for termination at the public safety answering point could be routed, instead, to a local-network, telephonic station thereby to complete the call another party.

It is in light of this background information related to packet-based, telephonic communication systems that the significant improvements of the present invention have evolved.

SUMMARY OF THE INVENTION

The present invention, accordingly, advantageously provides call-routing apparatus, and an associated method, by which to provide at least rudimentary call routing functions to route a call in a packet-based, or other, communication system.

Through operation of an embodiment of the present invention, local call handling at a portion of the communication system associated with an access gateway is provided subsequent to total failure of a communication link at a point beyond the access gateway and a softswitch. Local call control is provided to the local network, such as at the access gateway, subsequent to failure of the communication link. Local calling between telephonic station associated with the access gateway is provided by way of an emergency call router in substitution for the softswitch that normally would otherwise control calling functions. And, when a call is placed by a calling party positioned in the local network to be terminated at a remote public safety answering point, detection of the call at the emergency call router permits the call to be routed to a substitute station, thereby to permit the calling party to report to at least a substitute calling station so that a response thereto can be initiated by personnel positioned at the substitute calling location.

In one aspect of the present invention, a detector is provided to an access gateway for detecting the occurrence of a communication link failure of a communication link extending beyond the access gateway and to the softswitch. When the communication link fails, control functions provided by a softswitch are not able to be provided to telephonic stations associated with the access gateway. And, call connections requested by a calling party cannot be completed. When the detector detects the failure of the communication link, the emergency call router becomes operational to provide at least rudimentary local call control and handling functions. In one implementation, the substitute call router is embodied together with the access gateway. And, in another implementation, the call router forms a stand-alone unit permitting its connection to a gateway, or an aggregation point of more than one gateways. And, in a further implementation, the emergency call router also includes an additional voice call capability, such as that provided by a portable cellular phone.

Because local call control functions are provided by the emergency call router, calls within the local network are at least selectably effectuable.

In another aspect of the present invention, when the emergency call router becomes operational, due to the detection of the failure of the communication link, a telephonic station within the local network is selected, or otherwise designated, to be an emergency receiving station. The detection may be either automatically made or manually made. Calls originated by another calling party within the local network are routed by the call router to the selected telephonic station. Calls originated by the calling party that would be routed during normal telephonic system operation, to a public safety answering point, are instead routed to the selected telephonic station. Through appropriate positioning of personnel at the selected telephonic station, a request for assistance initiated by the calling station is able thereby at least to be delivered locally to personnel associated with the selected telephonic station.

In another aspect of the present invention, an alternate calling mechanism provided by a cellular, or other radio-telephonic device, also is embodied at the emergency call router. Personnel positioned at the emergency call router are thereby able to establish voice connections by way of the radiotelephonic device. And, more elaborately, switching functionality can also be provided by the alternate calling mechanism.

In another aspect of the present invention, a listing is maintained at the emergency call router of priorities to be associated with the type of call that is made while the substitute call router is operable to perform call control operations. The call-types include, for instance, emergency calls, such as calls that are placed to the public service access point, calls placed to published lower-digit, such as three digit, service centers, calls placed to from priority parties, and finally, low-priority, local calls. Additional listings prioritizing calls placed upon the identities of the calling parties can also alternately, or additionally, be utilized. When a call is routed to the emergency call router, access is made to the listing and comparison between the appropriate indicia of the call request and the prioritization of call-types contained in the listing. Calls are selectably permitted, or prevented, from routing within the local network responsive to the priority listing. And, calls are terminated, if necessary, by the call router if a higher-priority call is placed by a calling party and capacity in the local network is unavailable, but lower-priority calls are in process, the call router selectably terminates one, or more, of the lower-priority calls to permit the higher-priority call to be completed.

Thereby, in spite of the total failure of the communication link between the access gateway and the softswitch, local call control functionality is provided to permit at least limited communication in the local network associated with the access gateway. A calling party located in the local network is thereby also able to place a call to a designated emergency telephonic station.

In these and other aspects, therefore, apparatus, and an associated method, is provided for a communication system having a communication network. The communication system is controlled by a communication system controller also connected to the communication network. And, the communication network is connectable to an originating station operable to originate a call of at least a first selected call-type therefrom. The call is routable by way of a normal-operation communication link. Call completion of the call is facilitated when the call is of at least a first selected call-type and subsequent to failure of the normal-operation communication link. An emergency call router is at least coupled to the access gateway. The emergency call router selectably operates responsive to failure of the normal-operation communication link for routing the call of the first selected call-type, thereby to facilitate call completion of the first selected call-type originated by the origination station.

A more complete appreciation of the present invention and the scope thereof can be obtained from the accompanying drawings that are briefly summarized below, the detailed description of the presently preferred embodiments of the invention, and the appended claims.

DETAILED DESCRIPTION

Figure 1:
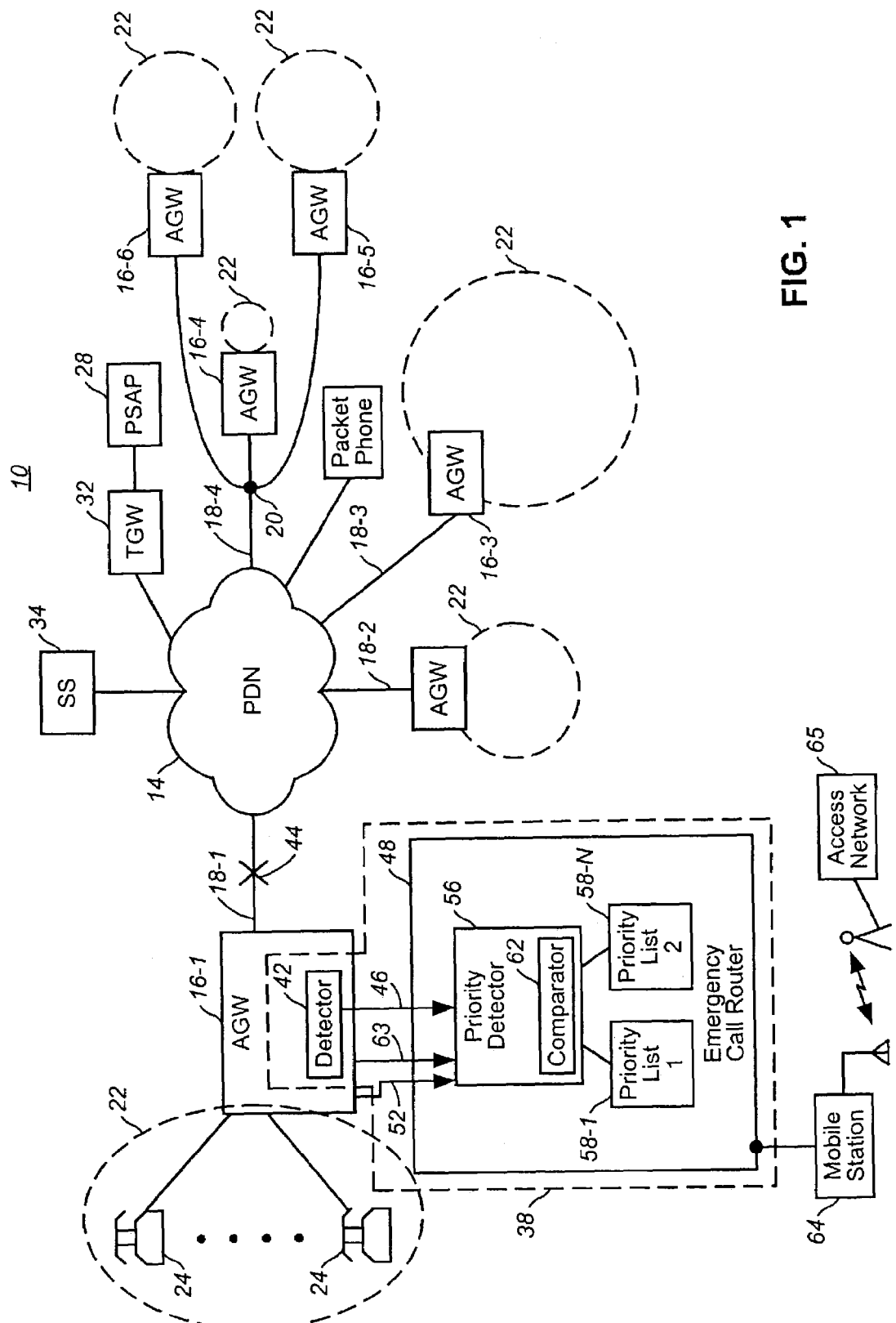
FIG. 1 illustrates a functional block diagram of a packet-based, telephonic communication system in which an embodiment of the present invention is operable.

Referring first to FIG. 1, a telephonic communication system, shown generally at 10, operates to provide for communications between communication stations, here telephonic stations, that are connected to, or otherwise operable in, the communication system. In the exemplary implementation, the communication system includes a next-generation, packet data network (PDN) 14. The network 14 is sometimes referred to as the communication fabric of the communication system. The network 14 here forms a packet network capable of communicating packet-formatted data. Communication of voice data, non-voice data, and combinations of different types of data is provided by the communication fabric formed of the packet data network.

A plurality of gateways, here access gateways (AGWs) 16 are coupled to the packet data network. Here, four exemplary gateways, gateways 16-1, 16-2, 16-3, and 16-4, are shown to be directly connected to the packet data network, here represented by way of communication links 18. While separately identified for purposes of illustration, the gateways form integral parts of the network. The communication links 18 are functionally represented in the figure, and the communication links are actually representative of any portion of a communication link extending beyond the respective gateway and through the packet data network. The communication link 18-1 extends beyond the gateway 16-1, the communication link 18-2 extends beyond the gateway 16-2, the communication link 18-3 extends beyond the gateway 16-3, and the communication link 18-4 extends beyond the gateway 16-4. Other communication links can analogously be represented. More generally, the failure can be of any type that interrupts normal communications through the absence of call control functionality.

The access gateway 16-4 here is connected to the network 14 by way of an aggregation location or point 20 to which other gateways or other functional devices are connected. Additional gateways, gateways 16-5 and 16-6, are coupled to the aggregation point 20 and are connected to the packet data network therethrough.

The gateways are associated with local networks 22 at which individual telephonic stations 24 are positioned. The gateways to which the local networks are connected form the access mechanism through which the telephonic stations are connected to the packet data network and through which all calls originated at, or to be terminated at, the telephonic stations of a particular local network are routed. If the local network associated with the access gateway is operable pursuant to a protocol that differs with the protocol pursuant to which the packet data network is operable, the access gateway performs translation operations to facilitate communications between telephonic stations of the local network and other telephonic stations. The local network may, for instance, form a legacy network that utilizes SS7 signaling. A gateway associated with such a local network operates, amongst other things, to convert the legacy SS7 signaling into a format appropriate for communication through the packet-based, packet data network. Encapsulation protocols, for instance, are utilized by the gateway to encapsulate SS7 messages to permit their communication through the packet data network.

The communication system 10 here further includes a public safety answering point (PSAP) 28 that is coupled to the packet data network by way of a trunking gateway (TGW) 32. The public safety answering point is generally representative of any public-service location. Here, more particularly, the public safety answering point is representative of an emergency dispatch center, such as a dispatch center associated with an emergency dialing code that calling parties enter to request emergency assistance. In the United States, the calling code formed of the digits 9-1-1 is the calling code associated with an emergency dispatch center of which the access point 28 is representative. When a call is made to the access point 28, appropriate responses to a request contained in the call is provided.

The communication system also includes a softswitch 34, also coupled to the packet data network. The softswitch, during normal operation of the communication system, provides call control functionality throughout the entire communication system. In a next-generation, telephonic communication system in which the packet data network forms an all-IP network, the softswitch is operable to communicate utilizing SIP (session initiation protocol) or another appropriate protocol. As, during normal operation of the communication system, the softswitch controls the call handling operations of all calls within the network, communication systems typically include redundant softswitch devices. In the event that a problem develops with one of the softswitches, at least one other redundant softswitch becomes operable to continue call handling operations.

However, corresponding redundancy of the communication links 18 is not necessarily provided. If a failure, i.e., absence of call control, occurs in a communication link 18, the access gateway, and, in turn, the local network associated therewith is unable to communicate pursuant to normal operation of the communication system. The failure might occur at any location between the access gateway and the softswitch. And, because call handling operations are provided by the softswitch 34, telephonic communication is unable to be effectuated within the local network. That is to say, a call to be originated and terminated within a local network cannot be completed due to the inability of the softswitch to provide call handling functions due to the failure of the communication link. And, because of the remote positioning of the public safety answering point, a call placed thereto by a telephonic station positioned in the local network cannot be completed due to the failure of the communication link.

Apparatus 38 of an embodiment of the present invention provides local call handling functionality in the event of failure of a communication link. The call handling functionality is provided locally and does not rely upon operation of the softswitch. Thereby, call control is effectuated at a local network, selectably to permit completion of local calls and also to route a call placed to the public service access point 28 to a designated local-network station. By routing the call to the access point 28 a designated local-network station, a calling party is able to alert personnel positioned at the local-network station of an emergency request. In the exemplary implementation, rudimentary call handling functionality is provided upon the occurrence of the communication link failure. For instance, supplementary services are disabled, or otherwise not provided. Only a subset of call handling functionality is provided, sometimes in manners different than in normal system operation.

The apparatus 38 here also includes a detector embodied at the access gateway with which the apparatus 38 is associated. The detector operates to detect the occurrence of a communication failure, here indicated by the marking 44, beyond the access gateway. Upon occurrence of the failure of the communication link, the call control functionality provided by the softswitch is no longer available.

Upon detection of the communication link failure, the detector generates an indication, here represented on the line 46, that is provided to an emergency call router 48. In one implementation, the emergency call router is also embodied at the access gateway with which the apparatus 38 is associated. In another implementation, the emergency call router forms a stand-alone unit that is releasably engageable with the gateway. The emergency call router 48 is operable to provide selected, rudimentary local call control functionality to the access gateway and the local network associated with the gateway. By providing the local call handling functionality to the local network, calls placed between telephonic stations of the local network are at least selectably completable. Selection of which calls are completed as well as routing of certain priority calls to designated, local-network telephonic stations is dependent, e.g., upon the call-type of the call being placed. Higher-priority calls are permitted to be completed prior to lower-priority calls. Call-types include, for instance, local calls, long distance calls, e.g., local toll calls, intra-state calls, inter-state calls, international calls, toll-free calls, operator calls, collect calls, and emergency calls. Upon failure of the communication link, many of such calls are no longer able to be completed.

The emergency call router is coupled to the gateway also to receive indications, here represented by indicia generated on the line 52, to receive indications of calls originated by telephonic stations in the local network associated with the access gateway 16. The emergency call router includes a priority detector 56 that prioritizes call requests to selectably permit completion of the calls originated by originating stations in the local network. If the originating, telephonic station requests a call with another local-network, telephonic station, depending upon the priority level of the call determined by the priority determiner 56, the call is permitted to be completed. Prioritization, in the exemplary implementation, is dependent upon priority listings contained in one or more priority lists 58 of the emergency call router. Here, N-priority lists are maintained, 58-1 through 58-N. The contents of one or more of the lists are accessed by the priority detector, and the priority level associated with a call, indicated by the indicia provided to the call router on the line 52 is compared by a comparator 62 of the priority detector against the priority contained in the accessed list. Responsive to the comparison, the call is either permitted to be completed, routed to a designated local-network station, or prevented from being completed.

In the exemplary implementation, a voice path 63 also extends from the access gateway to the emergency call router. And, the call router further comprises a radio telephonic station, here a cellular mobile station 64. Personnel operating the emergency call router are able to utilize the mobile station to establish a voice call, here by way of a cellular access network 65 with another location. Alternately, radio switching functionality can be provided to the mobile station to direct voice signals generated on the voice line 63 to the access network 65.

The priority in the list 58-1 is a calling party, priority listing in which priority levels are associated with the originating, telephonic stations from which calls are placed. And, the priority contained in the list 58-N is dependent upon the priority level associated with the called party. Such priority levels can also be maintained in a single listing. Prioritization, in one exemplary implementation, provides emergency calls placed to the public safety answering point 28 as the highest-priority calls. When a call is placed to the public safety answering point, the failure of the communication link prevents routing of the call thereto. The emergency call router, upon detection of the call, routes the call, instead, to a designated, local-network station thereby to complete the priority call thereto. Appropriate response to the call can thereafter be made. In an exemplary priority listing, a next-highest priority level is associated with calls originated at a telephonic station to be placed to a published, three-digit service center. And, next in line, are calls placed to, or from, priority callers, i.e., a selected list of calling stations, such as police, hospitals, and fire stations. And, finally, as a lowest-priority, calls placed within the local network between non-priority calling stations are provided.

The priority detector selectably routes the call or prevents routing of the call, depending upon the calling capacity within the local network and the priority level of the call. If a high-priority call is placed and capacity is not otherwise available, a lower-priority call is terminated by the emergency call router to permit the higher-priority call to be completed.

When an emergency call is placed, for instance, the access gateway is programmed to provide dialtone to the calling station and to accept call origination requests permitted for emergency situations. The emergency call router, in one implementation, processes only calls to emergency centers and calls within the local community encompassed by the local network. Priority is given to emergency calls, i.e., local calls within the local network are denied if the percentage of emergency calls rise above a defined limit. All other calls, such as long distance, 800 calls, etc., are denied. The access gateways are programmed to play an announcement or tone to indicate that only emergency and local calls are being accepted at a particular time. All requests for supplementary services, normally otherwise provided by the softswitch, are also denied. And, in one implementation, the emergency call router forms a simplex configuration analogous to the redundancy created in the softswitch, redundant emergency call routers.

During operation of one implementation, the access gateway registers with the associated emergency call router in the same manner as a failure-over to a backup softswitch subsequent to failure of a primary softswitch. Non-emergency calls can be denied by the access gateway automatically by activating call gapping upon a softswitch link failure or by the emergency call router when an access gateway registers with it for emergency service.

Figure 2:
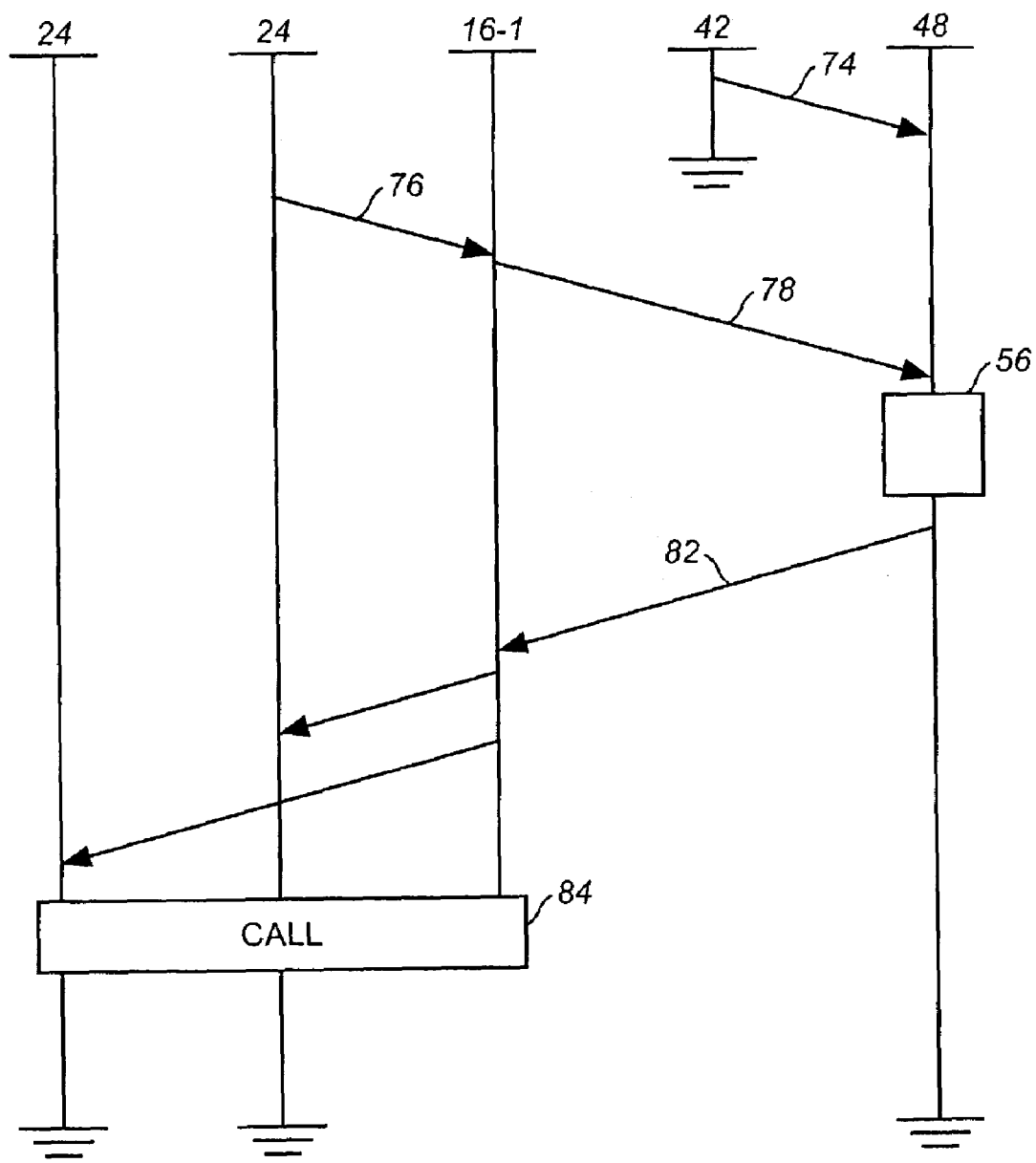
FIG. 2 illustrates a message sequence diagram representative of signaling generated during exemplary operation of the telephonic communication system shown in FIG. 1 subsequent to failure of a communication link.

FIG. 2 illustrates a message sequence diagram, shown generally at 72, representative of operation of signaling during operation of the communication system 10.

When a communication link extending beyond the access gateway fails, detection is made of the failure by the detector 42 of the access gateway and an indication is provided, indicated by the segment 74, to the emergency call router. The emergency call router becomes operable responsive thereto.

Subsequently, when an originating calling station 24 originates a call, a call request associated therewith is routed, indicated by the segment 76, to the access gateway. The access gateway, in turn, generates an indication of the call, indicated by the segment 78, to the emergency call router. When the emergency call router receives the indications of the call origination, determinations are made by the priority determiner 56 as to whether the call shall be permitted to be completed, in manners analogous to those described above. The results of the determinations, here permission to route the call to a designated, local-network station, is provided, indicated by the segment 82, to the access gateway. The access gateway, in turn, performs appropriate call setup procedures so that the call is completed between the originating calling station and a terminating calling station 24. The communication session, indicated by the block 84, is thereby provided.

Figure 3:
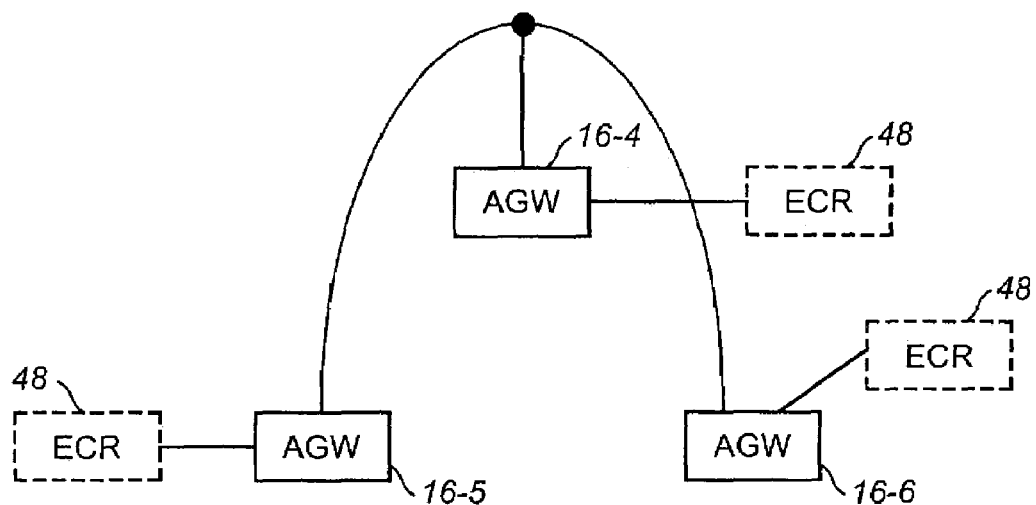
FIG. 3 illustrates a functional block diagram of a portion of a telephonic communication network, analogous to the telephonic communication network forming part of the system shown in FIG. 1, here to represent the portability of the substitute call router of an embodiment of the present invention.

FIG. 3 illustrates the access gateway 16-4, 16-5, and 16-6, shown to form a portion of the communication system 10 in FIG. 1 connected to the network 14 by way of the aggregation point 20. Here, the emergency call router 48 forms a portable, stand-alone unit, connectable to any of the access gateways. When connected to the access gateway 16-4, the emergency call router operates to provide local call handling functionality to all gateways subtending therefrom. That is to say, when the emergency call router is positioned at the gateway 16-4, the emergency call router provides call handling functionality to, in addition to the gateway 16-4, the gateways 16-5 and 16-6. When the emergency call router is implemented as a portable, stand-alone unit, the router is positionable at any location within the communication system made necessary due to the occurrence of a failure of a communication link.

Figure 4:
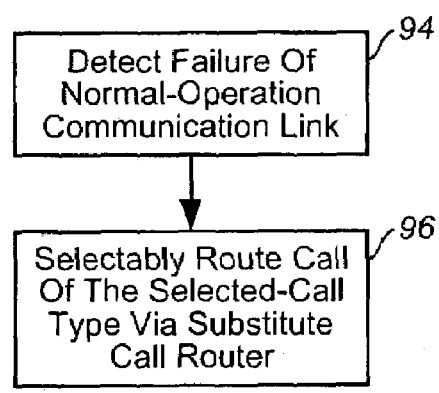
FIG. 4 illustrates a method flow diagram listing the method of operation of an embodiment of the present invention.

FIG. 4 illustrates a method flow diagram, shown generally at 92, that lists the method steps of an embodiment of the present invention. The method facilitates call completion of a call when the call is of at least a first selected call-type, subsequent to failure of a normal-operation communication link.

First, and as indicated by the block 94, failure of the normal-operation communication link is detected. Then, and as indicated by the block 96, a call request of the selected call-type is selectably routed by way of an emergency call router that is at least coupled to the access gateway. Thereby, call completion of the selected call of the call-type is facilitated between an origination station and a terminating station.

The previous descriptions are of preferred examples for implementing the invention, and the scope of the invention should not necessarily be limited by this description. The scope of the present invention is defined by the following claims:

What is claimed is:

1. In a communication system having a communication network, the communication system controlled by a communication system controller also connected to the communication network, and to an originating station operable to originate a call of at least a first selected call-type therefrom, the call routable by way of a normal-operation communication link, an improvement of apparatus for facilitating call completion of the call when the call is of the at least the first selected call-type and subsequent to failure of the normal-operation communication link, said apparatus comprising:

an emergency call router at least coupled to the access gateway, said emergency call router selectably operable responsive to failure of the normal-operation communication link for routing the call of the first selected call-type, thereby to facilitate call completion of the first selected call-type originated by the origination station; and a target gateway coupled to the emergency call router;

said emergency call router determines whether the call request is for a call of the first selected call-type prior to said operation of routing the call of the first selected call-type.

2. The apparatus of claim 1 wherein the communication network further is coupled to at least a first access gateway and wherein said emergency call router is embodied at the first access gateway.

3. The apparatus of claim 1 wherein the communication network is further coupled to at least a first access gateway and wherein said emergency call router forms a standalone entity, connectable to the access gateway.

4. The apparatus of claim 1 wherein the communication network is further coupled to at least a first access gateway and wherein the access gateway comprises a functional aggregation point at which a first gateway device and at least a second gateway device are connected and wherein said emergency call router is coupled to the functional aggregation point.

5. The apparatus of claim 1 further comprising a detector coupled to receive indications of communication integrity on the normal-operation communication link, said detector for detecting failure of the normal-operation communication link.

6. The apparatus of claim 5 wherein the communication network is further coupled to at least a first access gateway and wherein said detector is embodied at the access gateway, said detector further for notifying said emergency call router of detection thereat of the failure of the normal-operation communication link.

7. The apparatus of claim 1 wherein the communication network is further coupled to at least a first access gateway and wherein said emergency call router further comprises a call priority determiner operable at least responsive to failure of the normal-operation communication link, said priority determiner for determining a priority level associated with the call of the at least the first selected call-type pursuant to a priority hierarchy.

8. The apparatus of claim 7 wherein the call comprises a call priority indicia and wherein said call priority determiner determines the priority level associated with the call responsive to the call priority indicia.

9. The apparatus of claim 8 wherein said emergency call router further comprises a priority sequence list containing a listing of at least relative call-priority types and wherein said emergency call router further comprises a priority-level comparator coupled to receive indications of the priority level associated with a call request and indications of the priority sequence list, said priority-level comparator for comparing the priority level associated with the call of the at least the first selected call-type with the call-priority types contained in the listing.

10. The apparatus of claim 9 wherein the communication system further comprises a public safety answering point coupled to the communication network, wherein the call of the first call-type comprises public-safety-answering-point-directed call, and wherein said emergency call router operates to route the public-safety-answering-point directed call.

11. The apparatus of claim 10 wherein the communication system further comprises a local-network alternate station coupled to an access gateway and wherein said emergency call router operates to route the public-service-access-point-directed call to the local-network alternate station.

12. The apparatus of claim 1 wherein the communication system further comprises a local-network alternate station, wherein said emergency call muter is further for determining whether the call of the selected call-type shall be completable by way of the normal-operation communication link and for rerouting a call request to the local-network alternate station upon determination that the call completion by way of the normal-operation communication link.

13. The apparatus of claim 1 wherein the communication system further comprises a local network having at least a first local-network station, the local network associated with an access gateway, and wherein said emergency call router is further selectably operable responsive to failure of the normal-operation communication link for routing a call request to the local-network station.

14. The apparatus of claim 13 wherein the call request comprises a request for call termination at a selected one of the at least the first local-network station.

15. The apparatus of claim 14 wherein said emergency call router selects to route the call request to the local network station responsive to detection of the call and responsive to levels of call routing of the selected call-type.

16. The apparatus of claim 1 wherein said emergency call router comprises a portable standalone entity, deployable on an as-needed basis.

17. The apparatus of claim 16 wherein said emergency call router comprises a selectable database.

18. In a method of communicating in a communication system having a communication network, the communication system controlled by a communication system controller also connected to the communication network, and to an originating station operable to originate a call of at least a first selected call-type therefrom, the call routable by way of a normal-operation communication link, an improvement of a method for facilitating call completion of the call when the call is of the at least the first selected call-type and subsequent to failure of the normal-operation communication link, said method comprising:

detecting failure of the normal-operation communication link;

selectably routing a call request of the selected call-type by way of an emergency call router, thereby to facilitate call-completion of the selected call-type between the origination station and the terminating station;

connecting the emergency call router, as a preliminary operation, between at least a first access gateway and a target gateway of the communication system; and determining whether the call request is for a call of the selected call-type prior to said operation of selectably routing.

* * * * *